United States Patent
Deghel et al.

(10) Patent No.: US 11,647,465 B2
(45) Date of Patent: May 9, 2023

(54) POWER CONTROL ENHANCEMENTS FOR PHYSICAL UPLINK SHARED CHANNEL (PUSCH) MULTIPLEXING UPLINK CONTROL INFORMATION (UCI) OF DIFFERENT PRIORITY

(71) Applicant: NOKIA TECHNOLOGIES OY, Espoo (FI)

(72) Inventors: Matha Deghel, Paris (FR); Klaus Hugl, Vienna (AT); Zexian Li, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 117 days.

(21) Appl. No.: 17/193,661

(22) Filed: Mar. 5, 2021

(65) Prior Publication Data
US 2022/0286971 A1 Sep. 8, 2022

(51) Int. Cl.
*H04W 52/14* (2009.01)
*H04W 52/28* (2009.01)
*H04L 1/1867* (2023.01)
*H04L 1/1812* (2023.01)
*H04W 52/10* (2009.01)

(52) U.S. Cl.
CPC ......... *H04W 52/146* (2013.01); *H04L 1/1819* (2013.01); *H04L 1/1896* (2013.01); *H04W 52/10* (2013.01); *H04W 52/281* (2013.01)

(58) Field of Classification Search
None
See application file for complete search history.

(56) References Cited

U.S. PATENT DOCUMENTS

| 9,113,491 | B2 * | 8/2015 | Montojo | H04W 72/1242 |
| 2011/0141928 | A1 * | 6/2011 | Shin | H04W 72/02 370/252 |

(Continued)

OTHER PUBLICATIONS

3rd Generation Partnership Project; Technical Specification Group Radio Access Network; NR; Multiplexing and channel coding (Release 16), 3GPP S 38.212, V16.4.0, Dec. 2020.

(Continued)

*Primary Examiner* — Gregory B Sefcheck
(74) *Attorney, Agent, or Firm* — Squire Patton Boggs (US) LLP

(57) ABSTRACT

Systems, methods, apparatuses, and computer program products for the determination of PUSCH power control are provided. One method may include receiving, at a UE, at least one dedicated subset of power control parameters and corresponding values to be used for PUSCH power control in a case where a high priority UCI is multiplexed on a low priority PUSCH, and determining one subset from the at least one dedicated subset of power control parameters, or determining one subset from the at least one dedicated subset of power control parameters and determining at least one parameter from the determined subset. The method may also include applying, by the UE, the determined dedicated subset of power control parameters or the determined at least one power control parameter from the determined dedicated subset of power control parameters for determining the PUSCH transmission power when the high-priority UCI is multiplexed on the low-priority PUSCH.

20 Claims, 5 Drawing Sheets

(56) References Cited

U.S. PATENT DOCUMENTS

| | | | | |
|---|---|---|---|---|
| 2014/0029586 A1* | 1/2014 | Loehr | | H04W 56/0005 |
| | | | | 370/336 |
| 2014/0079002 A1* | 3/2014 | Chen | | H04W 74/0833 |
| | | | | 370/329 |
| 2014/0376471 A1* | 12/2014 | Nishio | | H04W 52/367 |
| | | | | 370/329 |
| 2015/0124743 A1* | 5/2015 | Damnjanovic | | H04L 5/0032 |
| | | | | 370/329 |
| 2016/0183195 A1* | 6/2016 | Gao | | H04W 52/325 |
| | | | | 455/522 |
| 2017/0013565 A1* | 1/2017 | Pelletier | | H04W 52/146 |
| 2017/0111873 A1* | 4/2017 | Kakishima | | H04W 52/143 |
| 2017/0195978 A1* | 7/2017 | Lindholm | | H04W 52/325 |
| 2018/0242264 A1* | 8/2018 | Pelletier | | H04W 52/325 |
| 2018/0279339 A1* | 9/2018 | Löhr | | H04W 52/365 |
| 2020/0260387 A1* | 8/2020 | Fu | | H04W 52/16 |
| 2020/0260391 A1* | 8/2020 | Zhou | | H04W 52/146 |
| 2020/0329832 A1* | 10/2020 | Wang | | H04W 52/346 |
| 2020/0383061 A1* | 12/2020 | Yang | | H04W 72/14 |
| 2021/0219241 A1* | 7/2021 | Wang | | H04L 1/1822 |
| 2022/0078768 A1* | 3/2022 | El Hamss | | H04L 5/0055 |
| 2022/0078812 A1* | 3/2022 | Fu | | H04W 72/1268 |
| 2022/0210800 A1* | 6/2022 | Babaei | | H04L 1/1819 |

OTHER PUBLICATIONS

3rd Generation Partnership Project; Technical Specification Group Radio Access Network; NR; Physical layer procedures for control (Release 16), 3GPP S 38.213, V16.4.0, Dec. 2020.

Nokia, Nokia Shanghai Bell, "Revised WID: Enhanced Industrial Internet of Thigns (IoT) and ultra-reliable and low latency communication (URLLC) support for NR", 3GPP TSG RAN Meeting #88e, RP-201310, Revision of RP-193233, Jun. 29, 2020.

* cited by examiner

POWER CONTROL ENHANCEMENTS FOR PHYSICAL UPLINK SHARED CHANNEL (PUSCH) MULTIPLEXING UPLINK CONTROL INFORMATION (UCI) OF DIFFERENT PRIORITY

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for the determination of physical uplink shared channel (PUSCH) power control.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to a method including configuring a user equipment with at least one dedicated subset of power control parameters and corresponding values to be used for physical uplink shared channel (PUSCH) power control in a case where a high-priority uplink control information (UCI) is multiplexed on a low-priority physical uplink shared channel (PUSCH).

Another embodiment is directed to an apparatus that may include at least one processor and at least one memory comprising computer program code. The at least one memory and computer program code are configured, with the at least one processor, to cause the apparatus at least to configure a user equipment with at least one dedicated subset of power control parameters and corresponding values to be used for physical uplink shared channel (PUSCH) power control in a case where a high-priority uplink control information (UCI) is multiplexed on a low-priority physical uplink shared channel (PUSCH).

In a variant, the at least one memory and computer program code are configured, with the at least one processor, to cause the apparatus at least to: when a single dedicated subset of power control parameters is configured, configure the user equipment to apply this single dedicated subset of power control parameters; or, when at least two dedicated subsets of power control parameters are configured, configuring the user equipment determine and apply a default subset of power control parameters from the at least two dedicated subsets.

In a variant, the at least one memory and computer program code are configured, with the at least one processor, to cause the apparatus at least to dynamically indicate, via downlink control information (DCI) to the user equipment, (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subsets of power control parameters to apply and/or which of at least one parameter to apply from the dedicated subset of power control parameters, when a high-priority UCI is multiplexed on a low-priority PUSCH.

In a variant, the at least one memory and computer program code are configured, with the at least one processor, to cause the apparatus at least to receive, from the user equipment, a low-priority physical uplink shared channel (PUSCH) including multiplexed high-priority uplink control information (UCI) based on the applied dedicated subset of power control parameters or the applied at least one power control parameter from the indicated subset of power control parameters.

In a variant, the at least one memory and computer program code are configured, with the at least one processor, to cause the apparatus at least to receive, from the user equipment, a low-priority physical uplink shared channel (PUSCH) including multiplexed high-priority uplink control information (UCI) based on the applied dedicated subset of power control parameters or the applied at least one power control parameter from the indicated subset of power control parameters.

In a variant, the at least one dedicated subset of power control parameters comprises at least one of: one or more open loop power control parameters; a closed-loop index; a transmit power-control (TPC) command; a scaling factor for at least one of the open loop power control parameters; and an offset for at least one of the open loop power control parameters.

In a variant, the at least one dedicated subset of power control parameters comprises a power control parameter for which the value is determined based on a value of the corresponding power control parameter for a physical uplink control channel (PUCCH) that is initially scheduled or configured to carry the high-priority uplink control information (UCI).

In a variant, when a scaling factor or offset for an open loop power control parameter is configured as part of the at least one dedicated subset of power control parameters, the scaling factor or offset is configured to be applied on a corresponding low-priority physical uplink shared channel (PUSCH) open loop power control parameter value when the high-priority uplink control information (UCI) is multiplexed on the low-priority physical uplink shared channel (PUSCH); or, when there is no high-priority uplink control information (UCI) to multiplex on the low-priority physical uplink shared channel (PUSCH), the scaling factor or offset is not applied.

In a variant, when one or more open loop power control parameters are configured as part of the at least one dedicated subset of power control parameters, the one or more open loop power control parameters are configured to be applied for a corresponding low-priority physical uplink shared channel (PUSCH) when the high-priority uplink control information (UCI) is multiplexed on the low-priority physical uplink shared channel (PUSCH); or, when there is no high-priority uplink control information (UCI) to multiplex on the low-priority physical uplink shared channel (PUSCH), the one or more open loop power control parameters are not applied.

In a variant, the indication is carried via downlink control information (DCI) corresponding to the low-priority physical uplink shared channel (PUSCH), or the indication is carried via downlink control information (DCI) corresponding to physical uplink control channel (PUCCH) carrying high-priority uplink control information (UCI), or the indication is carried via a group common downlink control information (DCI).

In a variant, the indication is made implicit by associating a value of a physical uplink shared channel (PUSCH) or physical uplink control channel (PUCCH) power control parameter to a certain value of at least one parameter from the dedicated set of power control parameters.

In a variant, the indication is explicitly indicated in a separate field in the downlink control information (DCI). In a variant, special fields are configured in the group common downlink control information (DCI) specifically to carry the indication.

Another embodiment is directed to a method including receiving, at a user equipment, at least one dedicated subset of power control parameters and corresponding values to be used for physical uplink shared channel (PUSCH) power control in a case where a high priority uplink control information (UCI) is multiplexed on a low priority physical uplink shared channel (PUSCH), determining one subset from the at least one dedicated subset of power control parameters, or determining one subset from the at least one dedicated subset of power control parameters and determining at least one parameter from the determined subset, and applying, by the user equipment, the determined dedicated subset of power control parameters or the determined at least one power control parameter from the determined dedicated subset of power control parameters for determining the physical uplink shared channel (PUSCH) transmission power when the high-priority uplink control information (UCI) is multiplexed on the low-priority physical uplink shared channel (PUSCH).

Another embodiment is directed to an apparatus that may include at least one processor and at least one memory comprising computer program code. The at least one memory and computer program code are configured, with the at least one processor, to cause the apparatus at least to receive at least one dedicated subset of power control parameters and corresponding values to be used for physical uplink shared channel (PUSCH) power control in a case where a high priority uplink control information (UCI) is multiplexed on a low priority physical uplink shared channel (PUSCH), determine one subset from the at least one dedicated subset of power control parameters, or determine one subset from the at least one dedicated subset of power control parameters and determine at least one parameter from the determined subset, and apply the determined dedicated subset of power control parameters or the determined at least one parameter from the determined dedicated subset of power control parameters to determine the physical uplink shared channel (PUSCH) transmission power when the high-priority uplink control information (UCI) is multiplexed on the low-priority physical uplink shared channel (PUSCH).

In a variant, the determining comprises receiving an indication via downlink control information (DCI) of (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subsets of power control parameters to apply and/or which of at least one parameter to apply from the dedicated subset of power control parameters, when a high-priority UCI is multiplexed on a low-priority PUSCH.

In a variant, when a single subset of power control parameters is configured, the determining comprises determining this single subset of power control parameters; or, when at least two subsets of power control parameters are configured, the determining comprises determining a default subset of power control parameters from the at least two subsets.

In a variant, the method may also include transmitting a low-priority physical uplink shared channel (PUSCH) including multiplexed high-priority uplink control information (UCI) based on the applied dedicated subset of power control parameters or the applied at least one power control parameter from the determined dedicated subset of power control parameters.

In a variant, the at least one dedicated subset of power control parameters comprises at least one of: one or more open loop power control parameters; a closed-loop index; a transmit power-control (TPC) command; a scaling factor for at least one of the open loop power control parameters; and an offset for at least one of the open loop power control parameters.

In a variant, the at least one dedicated subset of power control parameters comprises a power control parameter for which the value is determined based on a value of the corresponding power control parameter for a physical uplink control channel (PUCCH) that is initially scheduled or configured to carry the high-priority uplink control information (UCI).

In a variant, when a scaling factor or offset for an open loop power control parameter is configured as part of the at least one dedicated subset of power control parameters, the method comprises applying the scaling factor or offset on a corresponding low-priority physical uplink shared channel (PUSCH) open loop power control parameter value when the high-priority uplink control information (UCI) is multiplexed on the low-priority physical uplink shared channel (PUSCH); or, when there is not a high-priority uplink control information (UCI) to multiplex on the low-priority physical uplink shared channel (PUSCH), the scaling factor or offset is not applied.

In a variant, when one or more open loop power control parameters are configured as part of the at least one dedicated subset of power control parameters, the method comprises applying the one or more open loop power control parameters for a low-priority physical uplink shared channel (PUSCH) open loop power control parameter value when the high-priority uplink control information (UCI) is multiplexed on the low-priority physical uplink shared channel (PUSCH); or, when there is no high-priority uplink control information (UCI) to multiplex on the low-priority physical uplink shared channel (PUSCH), the one or more open loop power control parameters are not applied.

In a variant, the indication is received via downlink control information (DCI) corresponding to the low-priority physical uplink shared channel (PUSCH), or the indication is received via downlink control information (DCI) corresponding to physical uplink control channel (PUCCH) carrying high-priority uplink control information (UCI), or the indication is received via a group common downlink control information (DCI).

In a variant, the indication is implicit by associating a value of a physical uplink shared channel (PUSCH) or physical uplink control channel (PUCCH) power control parameter to a certain value of at least one parameter from the at least one dedicated set of power control parameters.

In a variant, the indication is explicitly indicated in a separate field in the downlink control information (DCI). In a variant, the group common downlink control information (DCI) comprises special fields configured specifically for carrying the indication.

BRIEF DESCRIPTION OF THE DRAWINGS

For proper understanding of example embodiments, reference should be made to the accompanying drawings, wherein.

DETAILED DESCRIPTION

Figure 1:
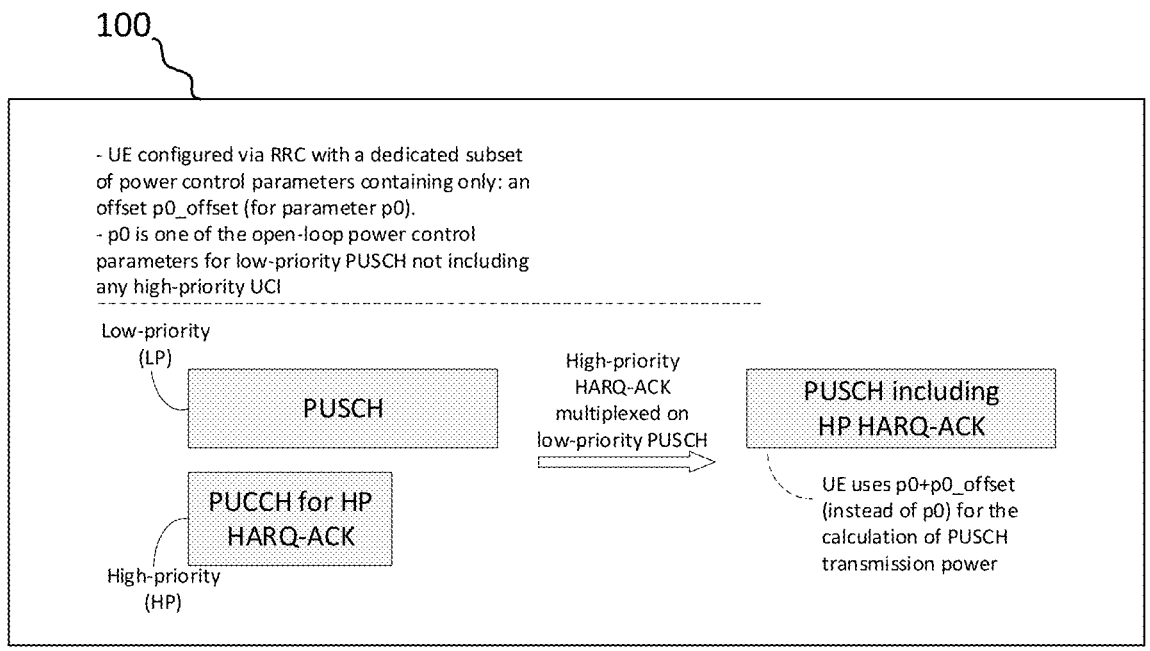
FIG. 1 illustrates an example diagram in which a high-priority hybrid automatic repeat request acknowledgement (HARQ-ACK) is multiplexed on a low-priority physical uplink shared channel (PUSCH), according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the determination of physical uplink shared channel (PUSCH) power control, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

New radio (NR) physical uplink shared channel (PUSCH) power control is based on a combination of open-loop power control and closed-loop power control. Open-loop power control, which includes support for fractional path-loss compensation, is where the UE estimates the uplink (UL) path-loss based on downlink (DL) measurements and sets the transmit power accordingly. Closed-loop power control is based on explicit transmit power-control (TPC) commands provided by the network.

Currently, the UE determines the PUSCH transmission power based on procedures described in $3^{rd}$ generation partnership project (3GPP) specifications, e.g., in 3GPP TS 38.213. According to these procedures, the UE is indicated or determines closed-loop parameters (closed-loop index, TPC command) and open-loop parameters (pathloss reference RS, p0, alpha). The TPC command is carried in the DCI scheduling the PUSCH transmission. Also, the TPC command (and corresponding closed-loop index) can be carried jointly to multiple UEs by means of group-common DCI using DCI format 22 (e.g., as described in 3GPP TS 38.212 as one example).

Hence, the main power control parameters on which the PUSCH transmission power depends include: closed-loop index (also known as PC adjustment state), TPC command ($f_{b,f,c}$, absolute or accumulative TPC command), pathloss reference RS (reference signal), p0 (also denoted as $P_{0\_UE\_PUSCH}$), and/or alpha (for partial of full path-loss compensation).

In Release-16 NR, consideration was given for better support of industrial IoT (IIoT) URLLC L1 enhancements. An important topic included therein related to intra-UE multiplexing and prioritization addressing control-data, control-control, and data-data multiplexing/prioritization. For an efficient support of intra-UE multiplexing and prioritization, in Release-16, two-levels of physical layer (PHY) priority (i.e., high—priority level 1/low—priority level 0) was introduced for UL data channels as well as UL control channels. In Release-16, only prioritization is supported between channels of different priorities, i.e., multiplexing between channels associated with different PHY priorities is not supported.

In Release-17 IIoT work, one of the important topics is on "Intra-UE multiplexing and prioritization of traffic with different priority". One of the objectives for the intra-UE multiplexing and prioritization work in Release-17 includes specifying multiplexing behavior among hybrid automatic repeat request-acknowledgment (HARQ-ACK)/scheduling request (SR)/channel state information (CSI) and PUSCH for traffic with different priorities, including the cases with uplink control information (UCI) on physical uplink control channel (PUCCH) and UCI on PUSCH.

Further, in Release-17 discussions on this topic, it has been agreed to study multiplexing (of high-priority channel and low-priority channel) for several scenarios of overlapping channels—so that the low-priority channel is not always dropped as in Release-16 NR (which is not preferable from a spectral efficiency and overall latency perspective). The scenario where a high-priority HARQ-ACK overlaps with low-priority PUSCH is one such relevant scenario. Specifically, it has been agreed that multiplexing HARQ-ACK in PUSCH of different priorities will be supported. For example, there may be support at least for multiplexing a low-priority HARQ-ACK in a high-priority PUSCH (conveying UL-SCH only), for multiplexing a high-priority HARQ-ACK in a low priority PUSCH (conveying UL-SCH only), for multiplexing a low-priority HARQ-ACK, a high-priority PUSCH conveying UL-SCH, a high-priority HARQ-ACK and/or CSI, and for multiplexing a high-priority HARQ-ACK, a low-priority PUSCH conveying UL-SCH, a low-priority HARQ-ACK and/or CSI.

It is noted that, when a high-priority HARQ-ACK (or more generally high-priority UCI) is multiplexed on a low-priority PUSCH, it is important to protect and/or to not affect the reliability of this HARQ-ACK (or UCI).

Thus, one aspect of example embodiments described herein relates to the PUSCH power control when a high-priority UCI is multiplexed on a low-priority PUSCH. It should be noted that, as used herein, UCI may refer to at least one of HARQ-ACK, scheduling request (SR), link recovery request (LRR), and/or CSI. Also, it should be noted that the HARQ-ACK can be positive (i.e., ACK or acknowledgement) or negative (i.e., NACK or non-acknowledgement). Similarly, for SR, it could be positive or negative.

In view of the above, it can be seen that the existing operations do not allow for determining suitable PUSCH power control for the case where a high-priority UCI is multiplexed on a low-priority PUSCH, in such a way to guarantee the reliability of the high-priority UCI. In other words, current specifications only allow to apply the same power control operation for low-priority PUSCH independent of whether high-priority UCI is multiplexed on this low-priority PUSCH or not.

As discussed in the foregoing, when a high-priority UCI is multiplexed on a low-priority PUSCH, it is desirable for this multiplexing to not impact the reliability and latency performance of the high-priority UCI. Actually, the requirements (at least in terms of reliability) of high-priority channel are typically more stringent than a low-priority channel. An important aspect in that regard is the power control of the low-priority PUSCH on which the high-priority UCI will be multiplexed.

Relying on the current operation for PUSCH power control determination may lead to low UL transmission power and impact the reliability of the high-priority UCI since the power control parameters of low-priority PUSCH will be used for the transmission of the PUSCH including the multiplexed high-priority UCI. Since at least some power control parameters of a low-priority channel would not be suitable to guarantee the reliability of the high-priority UCI (as at least the RRC configured power control parameters for PUSCH are the same regardless whether there is high-priority UCI multiplexed on this PUSCH or not), there is a need for enhancements to select and determine suitable PUSCH power control parameters for this case.

Based at least on the above, certain embodiments can address at least the problem of how to enable suitable determination of PUSCH power control, e.g., for the case where a high-priority UCI is multiplexed on low-priority PUSCH, in such a way to guarantee the reliability of the high-priority UCI.

According to an embodiment, a UE may be configured (via RRC) with at least one dedicated subset (or set) of power control parameters (and their corresponding values) to be used for PUSCH power control for the case where a high-priority UCI is multiplexed on a low-priority PUSCH. In some embodiments, any of the at least one dedicated subset of power control parameters may contain one or more of: at least one of open loop control parameters (p0, alpha, pathloss reference RS), closed-loop index, TPC command, scaling factor for at least one open loop power control parameter, and/or offset for at least one open loop power control parameter. In certain embodiments, any of the at least one dedicated subset of power control parameters may contain a power control parameter for which the value is determined based on the value of the corresponding power control parameter for PUCCH that was initially scheduled and/or configured to carry the high-priority UCI, i.e., high priority PUCCH.

According to an embodiment, if a scaling factor or offset for an open loop power control parameter is configured as part of any of the at least one dedicated subset of power control parameters, this scaling factor or offset may be applied on the corresponding low-priority PUSCH open loop power control parameter value when high-priority UCI is multiplexed on the low-priority PUSCH. Otherwise, if there is no high-priority UCI to be multiplexed on the low-priority PUSCH, the scaling factor or offset is not applied.

Based on the above configuration of at least one dedicated subset of power control parameters, the UE may apply one of the at least one dedicated subset of power control parameters for determining the PUSCH transmission power when a high-priority UCI is multiplexed on a low-priority PUSCH.

In certain embodiments, the UE may be configured with at least one dedicated subset of power control parameters (and corresponding values) and it may be dynamically indicated (e.g., via DCI) (i) whether to apply the dedicated subset of power control parameters and/or which of at least one parameter to apply from this dedicated subset, when a high-priority UCI is multiplexed on a low-priority PUSCH, if a single dedicated subset is configured, and/or (ii) which subset to apply when a high-priority UCI is multiplexed on a low-priority PUSCH, if at least two dedicated subsets are configured.

According to one embodiment, the indication may be carried via DCI scheduling low-priority PUSCH. In this case, the indication may be implicit by associating a value of a PUSCH power control parameter to a certain value of at least one parameter from the dedicated subset of power control parameters (if a single subset is configured). Alternatively, or additionally, the indication may be explicitly indicated in a separate field in the DCI scheduling a low-priority PUSCH. For Type 2 configured grant PUSCH, the association may be determined, or more generally the indication may be carried, through the DCI (re-)activating the Type 2 configured grant (CG) PUSCH configuration.

Alternatively, in an embodiment, the indication may be carried via DCI scheduling or corresponding to PUCCH carrying high-priority UCI; note that such DCI may be, for example, the DCI scheduling PDSCH(s) corresponding to high-priority HARQ-ACK. In this case, the indication may be implicit by associating a value of a PUCCH power control parameter to a certain value of at least one parameter from the dedicated subset of power control parameters (if a single subset is configured). Alternatively, or additionally, the indication may be explicitly indicated in a separate field in the DCI. For high-priority HARQ-ACK corresponding to semi-persistent scheduling (SPS) physical downlink shared channel (PDSCH), the association may be determined, or more generally the indication may be carried, by the DCI (re-)activating the SPS PDSCH configuration or even the DCI releasing the SPS PDSCH configuration.

In certain embodiments, the indication may be carried via a separate DCI, e.g., group common DCI. The indication may be implicit by associating a value of a PUSCH power control parameter to a certain value of at least one parameter from the dedicated subset of power control parameters (if a single subset is configured). Alternatively, there may special fields configured in the group common DCI (such as the UL power control in DCI 2_2) specifically for explicitly indicating (i) whether to apply the dedicated subset of power control parameters and/or which of at least one parameter to apply from this dedicated subset, when a high-priority UCI is multiplexed on a low-priority PUSCH, if a single dedicated subset is configured, and/or (ii) which subset to apply when a high-priority UCI is multiplexed on a low-priority PUSCH, if at least two dedicated subsets are configured.

In certain embodiments, the UE may be configured with at least one dedicated subset of power control parameters (and corresponding values) and which subset should apply depending on, e.g., UCI type, UCI size and so on. The UE may apply the corresponding dedicated subset of power control parameters when a given high-priority UCI (e.g., type) is multiplexed on a low-priority PUSCH. Alternatively, or additionally, the UE may be configured with a single dedicated subset of power control parameters, in which case the UE may determine to apply this subset when a high-priority UCI is multiplexed on a low-priority PUSCH. Alternatively, or additionally, the UE may be configured with more than one dedicated subset of power control parameters, in which case the UE may determine a default subset (from the more than one subset) to apply when a high-priority UCI is multiplexed on a low-priority PUSCH, e.g. if the UE is not dynamically indicated which subset to use/apply; as an example, the default subset may defined as the subset with the lowest index.

FIG. 1 illustrates an example diagram 100 depicting an embodiment for the case where a high-priority HARQ-ACK is multiplexed on a low-priority PUSCH. In the example of FIG. 1, the UE is configured via RRC with a dedicated subset of power control parameters containing an offset for p0, which is denoted as p0_offset. It is noted that p0 is one of the open-loop power control parameters for low-priority PUSCH not including any high-priority UCI. As can be seen in the example of FIG. 1, based on the multiplexing rule, the UE may determine to multiplex high-priority HARQ-ACK on low-priority PUSCH (e.g., since the PUSCH an PUCCH are overlapping in time). This is the condition to use the dedicated subset of power control parameters, which in this example contains just p0_offset. For the calculation of the PUSCH power control, the UE may then use p0+p0_offset (instead of p0). In other words, an offset is applied on the open-loop power control parameter p0 in order to guarantee the reliability of low-priority PUSCH and thus of the high-priority UCI multiplexed on this PUSCH. It is noted that, in this example embodiment, the other parameters needed for the PUSCH power control calculation are not impacted and can be determined using existing operations.

Figure 2:
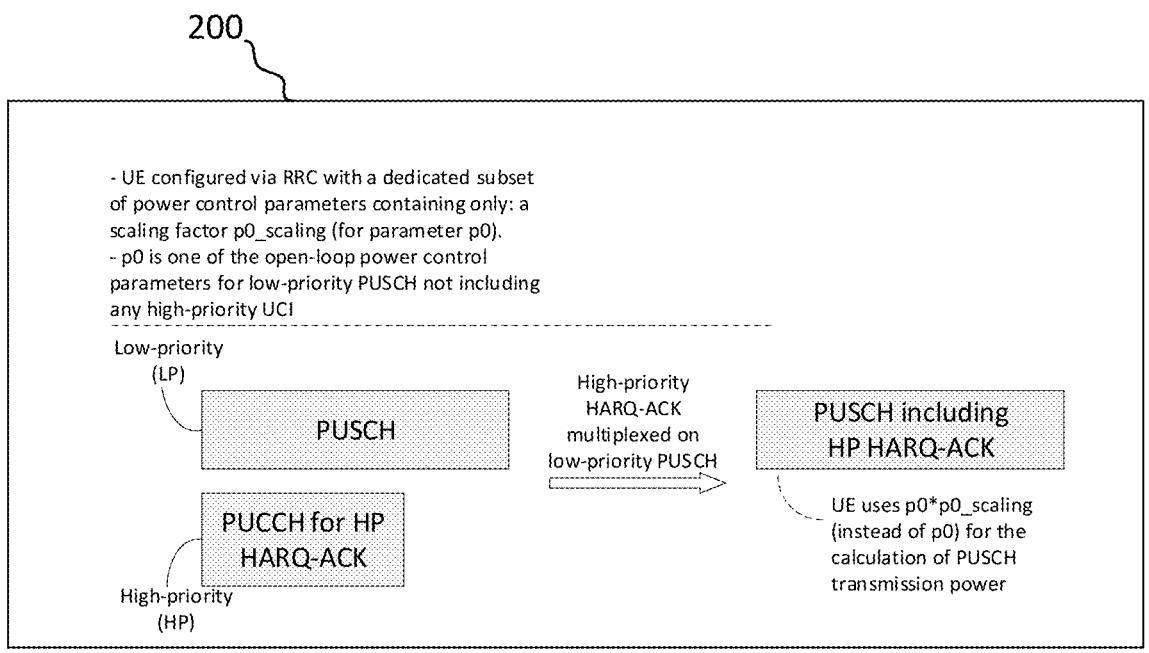
FIG. 2 illustrates another example diagram in which a high-priority HARQ-ACK is multiplexed on a low-priority PUSCH, according to an embodiment.

FIG. 2 illustrates another example diagram 200 depicting an embodiment for the case where a high-priority HARQ-ACK is multiplexed on a low-priority PUSCH. The example of FIG. 2 is similar to that of FIG. 1, however in the example of FIG. 2 the dedicated subset of power control parameters contains just a scaling factor (for p0) denoted as p0_scaling, with p0_scaling being larger than 1. For the calculation of the PUSCH power control, the UE may then use p0*p0_scaling (instead of p0). In other words, scaling is applied on the open-loop power control parameter p0 in order to guarantee the reliability of low-priority PUSCH and thus of the high-priority UCI multiplexed on this PUSCH. It is noted that, in this example embodiment, the other parameters needed for the PUSCH power control calculation are not impacted and can be determined using existing operations.

Figure 3:
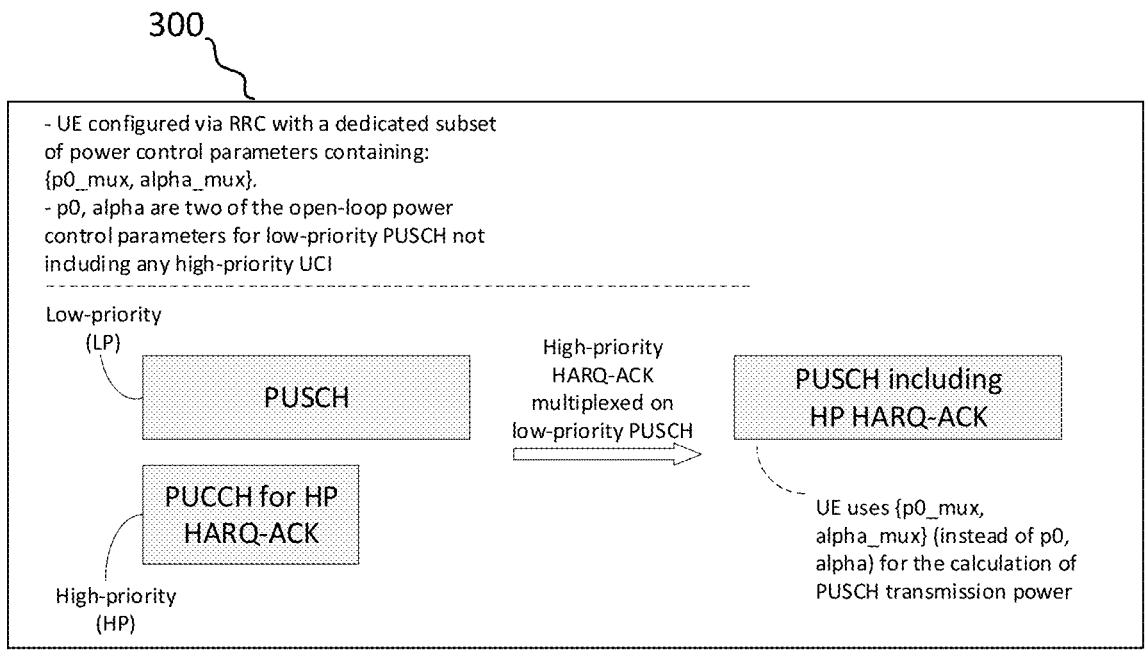
FIG. 3 illustrates another example diagram in which a high-priority HARQ-ACK is multiplexed on a low-priority PUSCH, according to an embodiment.

FIG. 3 illustrates yet another example diagram 300 of an embodiment for the case where a high-priority HARQ-ACK is multiplexed on a low-priority PUSCH. According to the example of FIG. 3, the UE may be configured via RRC with a dedicated subset of power control parameters. In the example of FIG. 3, the dedicated subset of power control parameters contains a dedicated p0 and alpha, which are denoted as p0_mux, alpha_mux. In this example, p0 and alpha are two of the open-loop power control parameters for low-priority PUSCH not including high-priority UCI. These dedicated {p0_mux, alpha_mux} are different from the {p0, alpha} that are used for low-priority PUSCH not including any high-priority UCI. As shown in the example of FIG. 3, the UE may use {p0_mux, alpha_mux} for the calculation of PUSCH transmission power.

As mentioned above, one possible alternative to the RRC-only approach (i.e., determination only based on higher layer configuration) can be to rely on dynamic indication using DL control signaling to instruct the UE of (i) whether to apply the dedicated subset of power control parameters and/or which of at least one parameter to apply from this dedicated subset, when a high-priority UCI is multiplexed on a low-priority PUSCH, if a single dedicated subset is configured, and/or (ii) which subset to apply when a high-priority UCI is multiplexed on a low-priority PUSCH, if at least two dedicated subsets are configured. In some embodiments, such an indication could be carried in the DCI (if any) scheduling the high-priority PUCCH corresponding to the high-priority UCI. One example for dynamic indication carried in the DCI (if any) scheduling high-priority PUCCH is illustrated in the diagram 400 of FIG. 4 for the case where a high-priority HARQ-ACK is multiplexed on a low-priority PUSCH.

Figure 4:
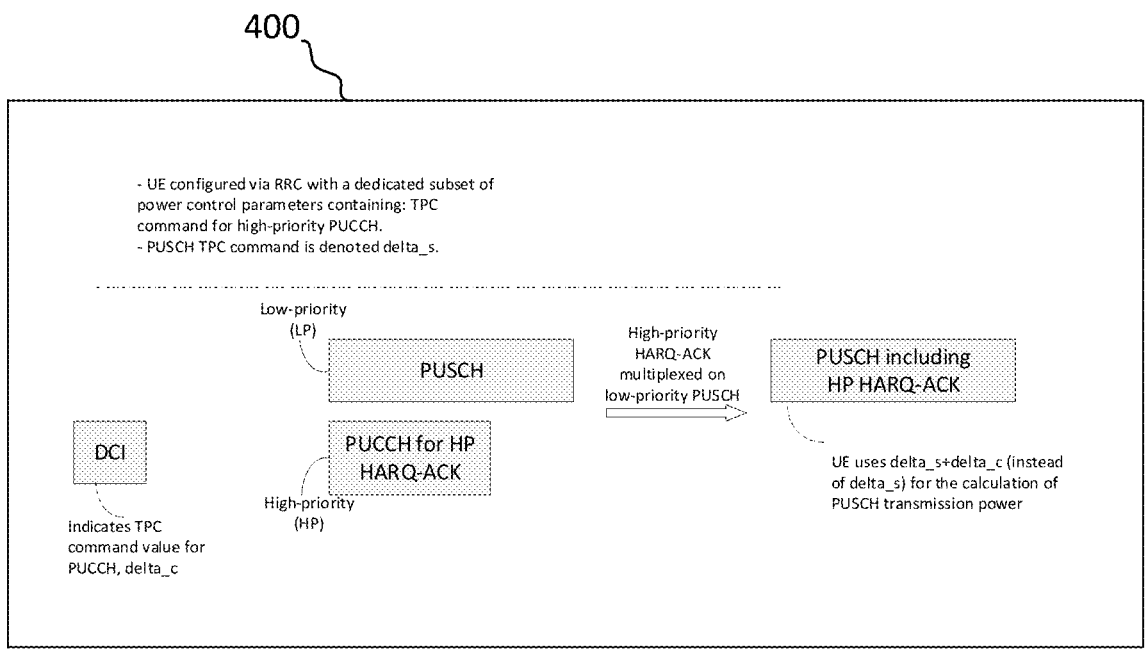
FIG. 4 illustrates another example diagram in which a high-priority HARQ-ACK is multiplexed on a low-priority PUSCH, according to an embodiment.

In one variant, the dedicated subset of power control parameters (mainly for the case where a single subset is configured) may contain at least one power control parameter corresponding to the PUCCH that is initially supposed to carry the high-priority UCI (i.e., the PUCCH that was initially scheduled/configured to carry this UCI). For example, it may only contain the TPC command corresponding to the high-priority PUCCH (which was initially scheduled to carry the high-priority UCI). Hence, the UE may replace the TPC command of low-priority PUSCH by the TPC command of (high-priority) PUCCH. Alternatively, the UE may use and/or apply the TPC command of (high-priority) PUCCH on top of the TPC command of low-priority PUSCH for the transmission of the low-priority PUSCH including the multiplexed high-priority UCI, i.e., both TPC commands are applied (which e.g. translates to summing the two TPC commands if they are in dB unit). The example 400 of FIG. 4 depicts this latter alternative, where delta_s denotes the PUSCH TPC command and delta_c denotes the PUCCH TPC command. In the example of FIG. 4, the UE may then use delta_s+delta_c (instead of delta_s) for the calculation of PUSCH transmission power.

In another variant, the TPC command for PUCCH carrying the high-priority UCI can be used to indicate if the normal set of power control parameters is used or if the dedicated sub-set of power control parameters specifically for the multiplexing of high-priority UCI on low-priority PUSCH are applied. As an example, at least one state of the TPC command for the scheduled PUCCH may instruct the UE to use the alternative power control parameter set (i.e., p0_offset/p0_scaling/p0_mux & alpha_mux); however, there could be several subsets of power control parameters configurable and the states of the TPC command could indicate different subsets of power control parameters.

Figure 5:
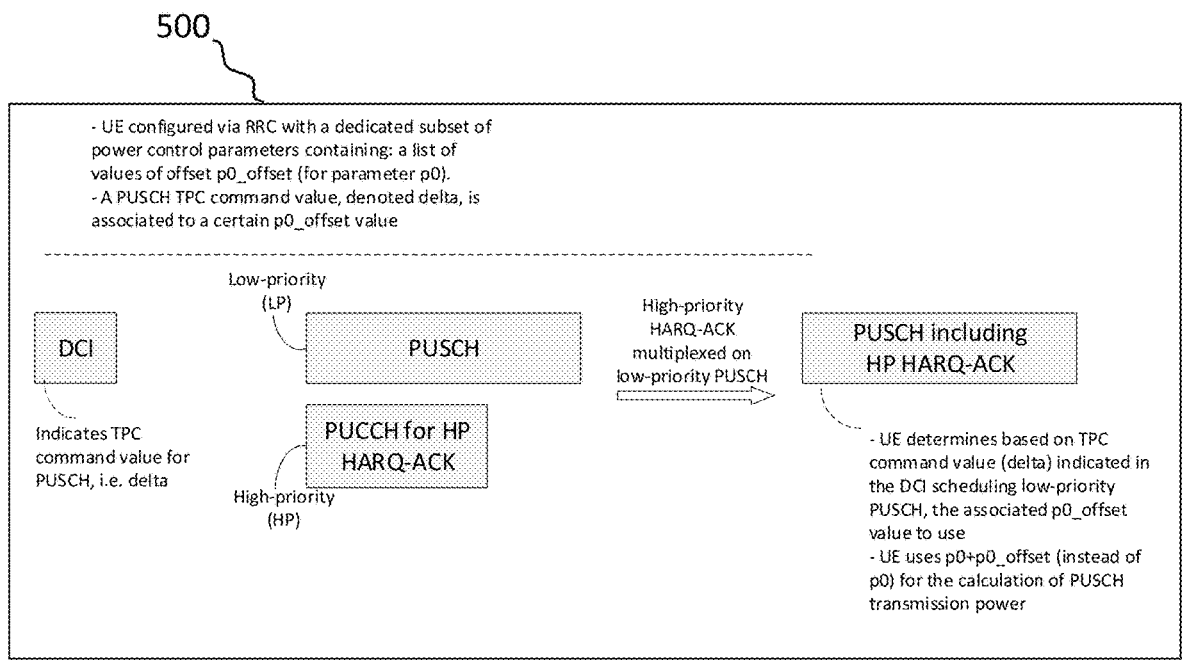
FIG. 5 illustrates an example diagram in which a high-priority HARQ-ACK is multiplexed on a low-priority PUSCH, according to an embodiment.

According to some embodiments, the indication may be carried in the DCI scheduling the low-priority PUSCH in case of dynamic grant (DG) PUSCH or the (re-)activation DCI in case of Type 2 configured-grant low-priority PUSCH. FIG. 5 illustrates one example diagram 500 of an embodiment for the case where a high-priority HARQ-ACK is multiplexed on a low-priority PUSCH. In an embodiment, the indication can be implicit by reinterpreting a certain field in this DCI. For example, there could be an association (e.g. via RRC or MAC CE) between a TPC command value and a certain p0_offset, i.e., each positive/negative (i.e., up/down) TPC command value is associated with a certain p0_offset/p0_scaling/p0_mux & alpha_mux. Hence, when indicated the TPC command for PUSCH, the UE can determine the corresponding p0_offset to apply, for instance as explained in the examples of FIG. 1, 2 or 3. Alternatively, in an embodiment, there could be an association between a p0 value for PUSCH and a certain p0_offset/p0_scaling/ p0_mux & alpha_mux. As another alternative, in an embodiment, there can be a separate bit field to carry the indication in the DCI (scheduling the low-priority PUSCH).

Alternatively or additionally, in some embodiments, a separate DCI may be used to carry the indication. For instance, group common DCI 2_2 (corresponding to PUCCH or PUSCH transmissions) can be used for this purpose. In addition, the variants noted above may also be applied here.

Figure 6A:
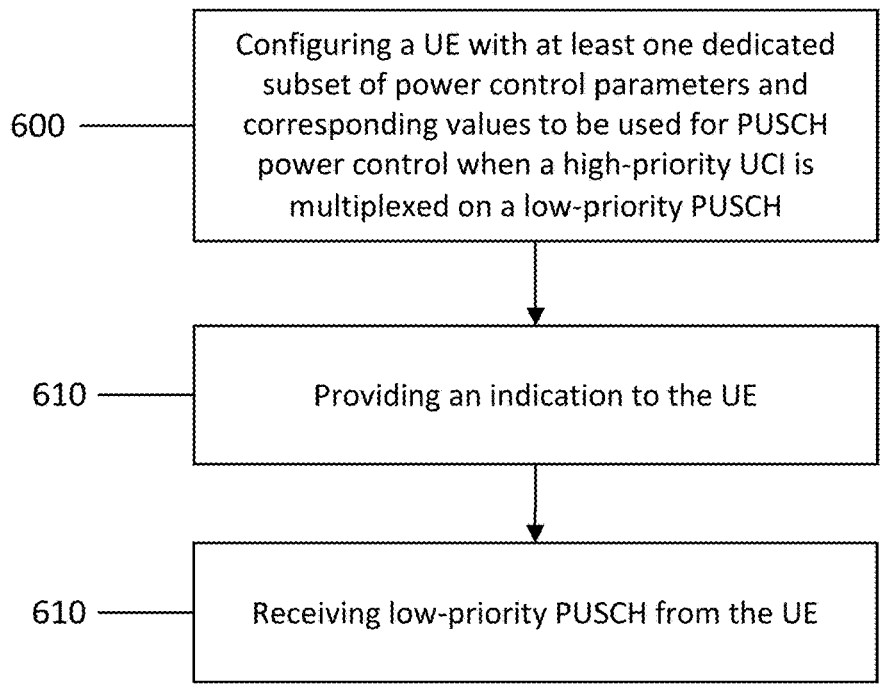
FIG. 6A illustrates an example flow diagram of a method, according to an embodiment.

FIG. 6A illustrates an example flow diagram of a method for determining PUSCH power control for the case where a high-priority UCI is multiplexed on a low-priority PUSCH, according to one embodiment. In certain example embodiments, the flow diagram of FIG. 6A may be performed by a network entity or network node in a communications system, such as LTE or 5G NR. In some example embodiments, the network entity performing the method of FIG. 6A may include or be included in a base station, access node, node B, eNB, gNB, NG-RAN node, transmission-reception points (TRPs), high altitude platform stations (HAPS), relay station or the like. As such, some of the operations illustrated in FIG. 6A may be similar to some operations shown in, and described with respect to, FIGS. 1-5. In some example embodiments, the network entity performing the method of FIG. 6A may include or be included in a user device or UE, for example, in case the operation is implemented over sidelink interface.

As illustrated in the example of FIG. 6A, the method may include, at 600, configuring a UE with at least one dedicated subset of power control parameters and corresponding values to be used for PUSCH power control in a case where a high-priority UCI is multiplexed on a low-priority PUSCH.

Although not depicted in the example of FIG. 6A, according to one embodiment, when a single dedicated subset of power control parameters is configured, the method may include configuring the UE to apply this single dedicated subset of power control parameters. Or, when at least two dedicated subsets of power control parameters are configured, the method may include configuring the user equipment to determine and apply a default subset of power control parameters from the at least two dedicated subsets.

Additionally or alternatively, as illustrated in the example of FIG. 6A, the method may include, at 610, providing an indication to the UE. In an embodiment, the providing 610 may include dynamically providing an indication to the UE, via DCI, to instruct the UE as to (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subset of power control parameters to apply and/or which of at least one parameter to apply from the dedicated subset of power control parameters, when a high-priority UCI is multiplexed on a lower-priority PUSCH.

According to certain embodiments, the method may also include, at 620, receiving, from the UE, a low-priority PUSCH including multiplexed high-priority UCI based on the applied dedicated subset of power control parameters or the applied at least one power control parameter from the indicated subset of power control parameters.

In an embodiment, any of the at least one dedicated subset of power control parameters may include, for example, one or more open loop power control parameters, a closed-loop index, a TPC command, a scaling factor for at least one of the open loop power control parameters, and/or an offset for at least one of the open loop power control parameters. According to some embodiments, the at least one dedicated subset of power control parameters may include a power control parameter for which the value is determined based on a value of the corresponding power control parameter for a PUCCH that is initially scheduled or configured to carry the high-priority UCI.

In one embodiment, when a scaling factor or offset for an open loop power control parameter is configured as part of the at least one dedicated subset of power control parameters, the scaling factor or offset is configured to be applied on a corresponding low-priority PUSCH open loop power control parameter value when the high-priority UCI is multiplexed on the low-priority PUSCH. Otherwise, when there is no high-priority UCI to multiplex on the low-priority PUSCH, the scaling factor or offset is configured not to be applied.

In certain embodiments, when one or more open loop power control parameters are configured as part of the at least one dedicated subset of power control parameters, the one or more open loop power control parameters are configured to be applied for a corresponding low-priority physical uplink shared channel (PUSCH) when the high-priority uplink control information (UCI) is multiplexed on the low-priority physical uplink shared channel (PUSCH). Otherwise, when there is no high-priority uplink control information (UCI) to multiplex on the low-priority physical uplink shared channel (PUSCH), the one or more open loop power control parameters are not applied.

According to some embodiments, the indication may be carried via DCI scheduling low-priority PUSCH. For example, for Type 2 configured grant PUSCH, the association may be determined through the DCI (re-)activating the Type 2 CG PUSCH configuration. In certain embodiments, the indication may be carried via DCI corresponding to PUCCH carrying high-priority UCI. For example, for high-priority HARQ-ACK corresponding to SPS PDSCH, the association may be determined by the DCI (re-)activating the SPS PDSCH configuration. According to some embodiments, the indication may be carried via a group common DCI.

In certain embodiments, the indication may be made implicit by associating a value of a PUSCH or PUCCH power control parameter to a certain value of at least one parameter from the dedicated set of power control parameters. According to an embodiment, the indication may be explicitly indicated in a separate field in the DCI.

According to some embodiments, special fields may be configured in the group common DCI specifically for explicitly carrying the indication to the UE. In other example embodiments, there may special fields configured in the group common DCI (such as the UL power control in DCI 2_2) specifically for explicitly indicating the dedicated (subset of) power control parameter.

Figure 6B:
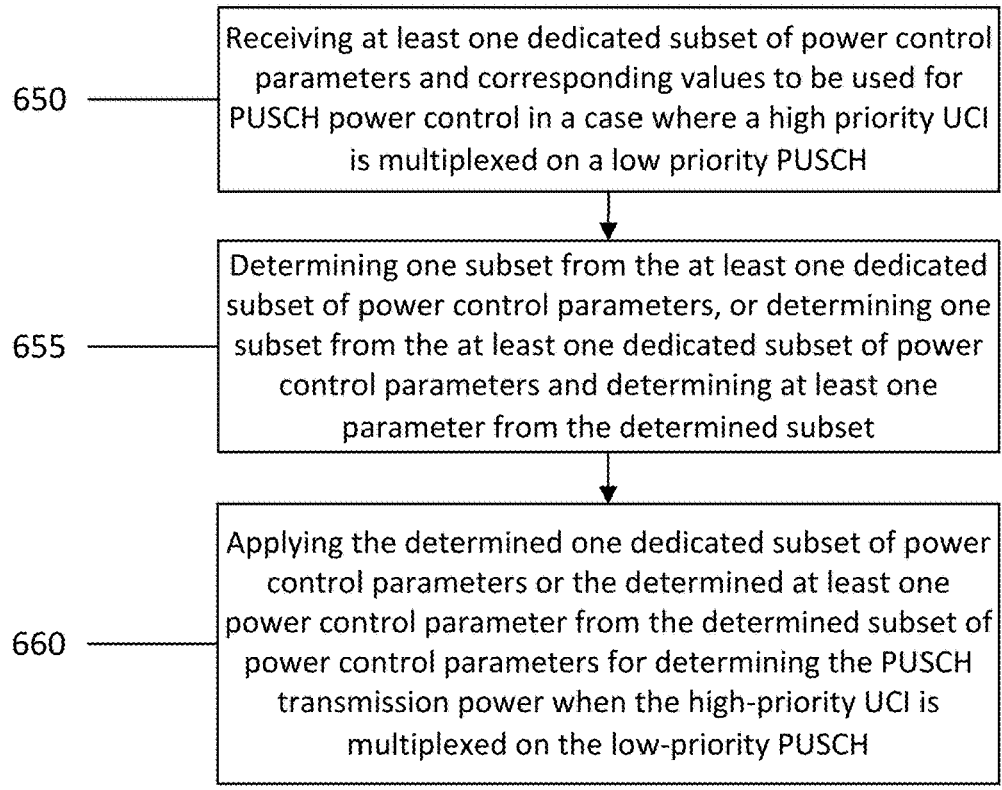
FIG. 6B illustrates an example flow diagram of a method, according to an embodiment.

FIG. 6B illustrates an example flow diagram of a method for determining PUSCH power control for the case where a high-priority UCI is multiplexed on a low-priority PUSCH, according to one embodiment. In certain example embodiments, the flow diagram of FIG. 6B may be performed by a network entity or network node in a communications system, such as LTE or 5G NR. In some example embodiments, the network entity performing the method of FIG. 6B may include or be included in UE, communication node, mobile equipment (ME), mobile station, mobile device, stationary device, IoT device, or other device. As such, some of the operations illustrated in FIG. 6B may be similar to some operations shown in, and described with respect to, FIGS. 1-5.

As illustrated in the example of FIG. 6B, the method may include, at 650, receiving at least one dedicated subset of power control parameters and corresponding values to be used for PUSCH power control in a case where a high priority UCI is multiplexed on a low priority PUSCH. In an embodiment, the at least one dedicated subset of power control parameters may include, for example, one or more open loop power control parameters, a closed-loop index, a TPC command, a scaling factor for at least one of the open loop power control parameters, and/or an offset for at least one of the open loop power control parameters. According to some embodiments, the at least one dedicated subset of power control parameters may include a power control parameter for which the value is determined based on a value of the corresponding power control parameter for a PUCCH that was initially scheduled or configured to carry the high-priority UCI.

In one example embodiment, the method may optionally include, at 655, determining one subset from the at least one dedicated subset of power control parameters, or determining one subset from the at least one dedicated subset of power control parameters and determining at least one parameter from the determined subset. For example, in one embodiment, the determining 655 may include receiving, from the network, a dynamic indication, via DCI, of (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subsets of power control parameters to apply and/or which of at least one parameter to apply from the dedicated subset of power control parameters, when a high-priority UCI is multiplexed on a lower-priority PUSCH. For example, in another embodiment, when a single subset of power control parameters is configured, the determining 655 may comprise determining this single subset of power control parameters; or when at least two subsets of power control parameters are configured, the determining 655 may comprise determining a default subset of power control parameters from the at least two subsets of power control parameters.

As also illustrated in the example of FIG. 6B, the method may include, at 660, applying the determined one dedicated subset of power control parameters or the determined at least one power control parameter from the determined subset of power control parameters for determining the PUSCH transmission power when the high-priority UCI is multiplexed on the low-priority PUSCH.

In one embodiment, when a scaling factor or offset for an open loop power control parameter is configured as part of the at least one dedicated subset of power control parameters, the scaling factor or offset is applied on a corresponding low-priority PUSCH open loop power control parameter value when the high-priority UCI is multiplexed on the low-priority PUSCH. Otherwise, when there is not a high-priority UCI to multiplex on the low-priority PUSCH, the scaling factor or offset is not applied. In some embodiments, when one or more open loop power control parameters are configured as part of the at least one dedicated subset of power control parameters, the method may include applying the one or more open loop power control parameters for a low-priority PUSCH open loop power control parameter value when the high-priority UCI is multiplexed on the low-priority PUSCH. Otherwise, when there is no high-priority UCI to multiplex on the low-priority PUSCH, the one or more open loop power control parameters are not applied.

According to certain embodiments, the method may include dynamically receiving an indication, via DCI, of (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subset of power control parameters to apply and/or which of at least one parameter to apply from the dedicated subset of power control parameters, when a high-priority UCI is multiplexed on a lower-priority PUSCH. In an embodiment, the indication may be received via DCI corresponding to the low-priority PUSCH. According to one embodiment, the indication may be received via DCI corresponding to PUCCH carrying high-priority UCI. In one embodiment, the indication may be received via a group common DCI.

In certain embodiments, the indication may be made implicit by associating a value of a PUSCH power control parameter to a certain value of at least one parameter from the dedicated set of power control parameters. According to an embodiment, the indication may be explicitly indicated in a separate field in the DCI. For example, for Type 2 configured grant PUSCH, the association may be determined through the DCI (re-)activating the Type 2 CG PUSCH configuration. For example, for high-priority HARQ-ACK corresponding to SPS PDSCH, the association may be determined by the DCI (re-)activating the SPS PDSCH configuration.

According to some embodiments, special fields may be configured in the group common DCI specifically for explicitly carrying the indication. In other example embodiments, there may special fields configured in the group common DCI (such as the UL power control in DCI 2_2) specifically for explicitly indicating the dedicated (subset of) power control parameter.

According to certain embodiments, although not explicitly illustrated in the example of FIG. 6B, the method may also include transmitting a low-priority PUSCH including multiplexed high-priority UCI based on the applied dedicated subset of power control parameters or the applied at least one power control parameter from the determined dedicated subset of power control parameters.

Figure 7A:
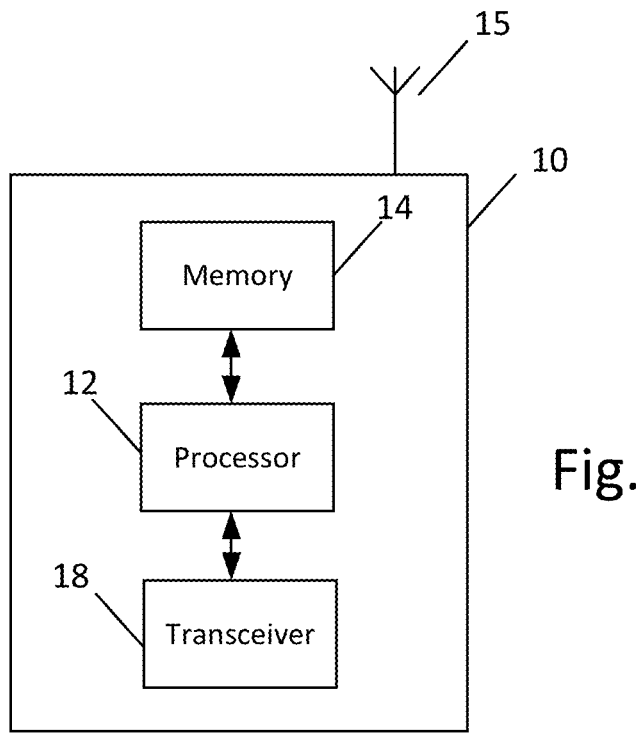
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be an eNB in LTE or gNB in 5G, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as that illustrated in FIG. 6A, or any other method described herein. In some embodiments, as discussed herein, apparatus 10 may be configured to perform a procedure relating to determining PUSCH power control for the case where a high-priority UCI is multiplexed on a low-priority PUSCH, as discussed elsewhere herein, for example.

For instance, in some embodiments, apparatus 10 may be controlled by memory 14 and processor 12 to configure a UE with at least one dedicated subset of power control parameters and corresponding values to be used for PUSCH power control in a case where a high-priority UCI is multiplexed on a low-priority PUSCH. According to an embodiment, apparatus 10 may be controlled by memory 14 and processor 12 to provide an indication to the UE. In an embodiment, the indication may be dynamically provided, via DCI, to instruct the UE as to (i) when a single dedicated subset of power control parameters is configured, whether to apply the single dedicated subset and/or which of at least one parameter to apply from the single dedicated subset of power control parameters, when a high-priority UCI is multiplexed on a low-priority PUSCH, and/or (ii) when at least two dedicated subsets of power control parameters are configured, which subset from the at least two dedicated subsets of power control parameters to apply and/or which of at least one parameter to apply from the dedicated subset of power control parameters, when a high-priority UCI is multiplexed on a low-priority PUSCH. According to certain embodiments, apparatus 10 may be controlled by memory 14 and processor 12 to receive, from the UE, a low-priority uplink shared channel (PUSCH) including multiplexed high-priority UCI based on the applied at least one parameter from the at least one dedicated subset of power control parameters.

Figure 7B:
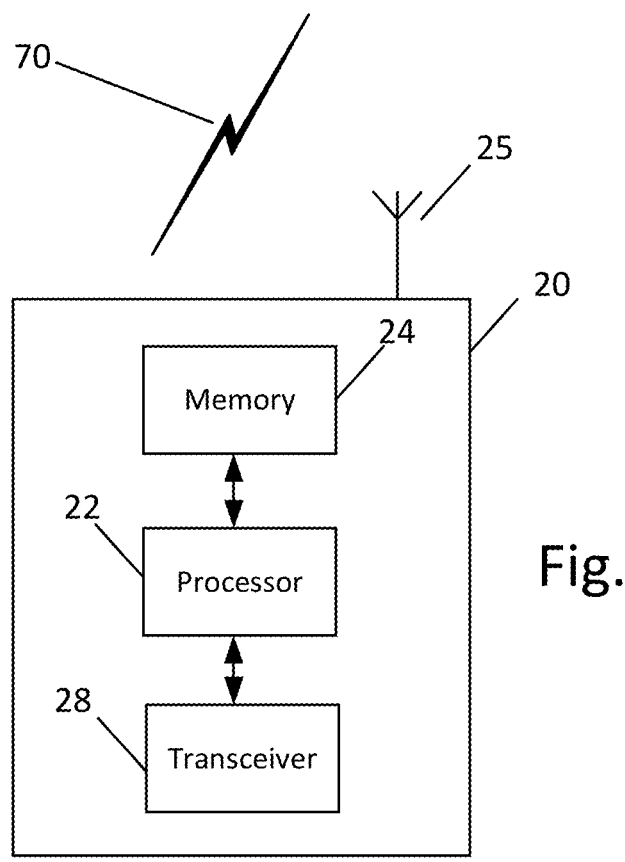
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 6B, or any other method described herein. For example, in an embodiment, apparatus 20 may be controlled to perform a process relating to determining PUSCH power control for the case where a high-priority UCI is multiplexed on a low-priority PUSCH, as described in detail elsewhere herein.

For instance, in certain embodiments, apparatus 20 may be controlled by memory 24 and processor 22 to receive at least one dedicated subset of power control parameters and corresponding values to be used for PUSCH power control in a case where a high priority UCI is multiplexed on a low priority PUSCH. In one example embodiment, apparatus 20 may be controlled by memory 24 and processor 22 to determine one subset from the at least one dedicated subset of power control parameters, or determine one subset from the at least one dedicated subset of power control parameters and determine at least one parameter from the determined subset. According to an embodiment, apparatus 20 may be controlled by memory 24 and processor 22 to apply the determined dedicated subset of power control parameters or the determined at least one power control parameter from the determined dedicated subset of power control parameters for determining the PUSCH transmission power when the high-priority UCI is multiplexed on the low-priority PUSCH. In some embodiments, apparatus 20 may be controlled by memory 24 and processor 22 to transmit a low-priority uplink shared channel (PUSCH) including multiplexed high-priority uplink control information (UCI) based on the applied at least one parameter from the at least one dedicated subset of power control parameters.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, as discussed in detail above, certain embodiments provide solutions that allow for having a suitable adjustment of a low-priority PUSCH transmission power when a high-priority UCI is multiplexed on this PUSCH. As such, example embodiments are able to guarantee the reliability of the high-priority UCI. In addition, example embodiments have the merit of being easily applied without complicating the PUSCH power control operation. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
      the at least one memory and computer program code are configured, with the at least one processor, to cause the apparatus at least to:
      configure a user equipment with a plurality of subsets of power control parameters and corresponding values to be used for physical uplink shared channel (PUSCH) power control, wherein the plurality of subsets of power control parameters comprise at least one dedicated subset of power control parameters for high-priority PUSCH, at least one dedicated subset of power control parameters for low-priority PUSCH, and at least one dedicated subset of power control parameters for high-priority uplink control information (UCI) that is multiplexed on the low-priority PUSCH.

2. The apparatus of claim 1, wherein the at least one memory and computer program code are further configured, with the at least one processor, to cause the apparatus at least to:
   when a single dedicated subset of power control parameters for the high-priority UCI that is multiplexed on the low-priority PUSCH is configured, configure the user equipment to apply this single dedicated subset of power control parameters; or
   when at least two dedicated subsets of power control parameters for the high-priority UCI that is multiplexed on the low-priority PUSCH are configured, configure the user equipment to determine and apply a default one subset of power control parameters from the at least two dedicated subsets.

3. The apparatus of claim 2, wherein the at least one memory and computer program code are further configured, with the at least one processor, to cause the apparatus at least to receive, from the user equipment, the low-priority PUSCH including the multiplexed high-priority UCI based on the applied dedicated subset of power control parameters or the applied at least one power control parameter from the indicated subset of power control parameters.

4. The apparatus of claim 1, wherein the at least one memory and computer program code are further configured, with the at least one processor, to cause the apparatus at least to dynamically indicate, via downlink control information (DCI) to the user equipment, (i) when a single dedicated subset of power control parameters for the high-priority UCI that is multiplexed on the low-priority PUSCH is configured, whether to apply the single dedicated subset and/or which of at least one parameter to apply from the single dedicated subset of power control parameters, and/or (ii) when at least two dedicated subsets of power control parameters for the high-priority UCI that is multiplexed on the low-priority PUSCH are configured, which subset from the at least two dedicated subsets of power control parameters to apply and/or which of at least one parameter to apply from the dedicated subset of power control parameters.

5. The apparatus of claim 4, wherein the at least one memory and computer program code are further configured, with the at least one processor, to cause the apparatus at least to receive, from the user equipment, the low-priority PUSCH including the multiplexed high-priority UCI based on the applied dedicated subset of power control parameters or the applied at least one power control parameter from the indicated subset of power control parameters.

6. A method, comprising:
   receiving, at a user equipment, a plurality of subsets of power control parameters and corresponding values to be used for physical uplink shared channel (PUSCH) power control, wherein the plurality of subsets of power control parameters comprise at least one dedicated subset of power control parameters for high priority PUSCH, at least one dedicated subset of power control parameters for low-priority PUSCH, and at least one dedicated subset of power control parameters for high-priority uplink control information (UCI) that is multiplexed on the low priority PUSCH;
   determining one subset from the at least one dedicated subset of power control parameters for the high-priority UCI that is multiplexed on the low priority PUSCH, or determining one subset from the at least one dedicated subset of power control parameters for the high-priority UCI that is multiplexed on the low priority PUSCH and determining at least one parameter from the determined subset; and
   applying, by the user equipment, the determined dedicated subset of power control parameters or the determined at least one power control parameter from the determined dedicated subset of power control parameters for determining the PUSCH transmission power when the high-priority UCI is multiplexed on the low-priority PUSCH.

7. The method of claim 6, wherein the determining comprises receiving an indication via downlink control information (DCI) of (i) when a single dedicated subset of power control parameters for the high-priority UCI that is multiplexed on the low-priority PUSCH is configured, whether to apply the single dedicated subset and/or which of at least one parameter to apply from the single dedicated subset of power control parameters, and/or (ii) when at least two dedicated subsets of power control parameters for the high-priority UCI that is multiplexed on the low-priority PUSCH are configured, which subset from the at least two dedicated subsets of power control parameters to apply and/or which of at least one parameter to apply from the dedicated subset of power control parameters.

8. The method of claim 6, wherein, when a single subset of power control parameters for the high-priority UCI that is multiplexed on the low-priority PUSCH is configured, the determining comprises determining this single subset of power control parameters; or
   wherein, when at least two subsets of power control parameters for the high-priority UCI that is multiplexed on the low-priority PUSCH are configured, the determining comprises determining a default subset of power control parameters from the at least two subsets.

9. The method of claim 8, further comprising transmitting a low-priority PUSCH including multiplexed high-priority UCI based on the applied dedicated subset of power control parameters or the applied at least one power control parameter from the determined dedicated subset of power control parameters.

10. The method of claim 7, further comprising transmitting a low-priority PUSCH including multiplexed high-priority UCI based on the applied dedicated subset of power control parameters or the applied at least one power control parameter from the determined dedicated subset of power control parameters.

11. The method of claim 6, wherein the at least one dedicated subset of power control parameters for the high-priority UCI that is multiplexed on the low-priority PUSCH comprises at least one of:
   one or more open loop power control parameters;
   a closed-loop index;
   a transmit power-control (TPC) command;
   a scaling factor for at least one of the open loop power control parameters; and
   an offset for at least one of the open loop power control parameters.

12. An apparatus, comprising:
   at least one processor; and
   at least one memory comprising computer program code, the at least one memory and computer program code are configured, with the at least one processor, to cause the apparatus at least to:
   receive a plurality of subsets of power control parameters and corresponding values to be used for physical uplink shared channel (PUSCH) power control, wherein the plurality of subsets of power control parameters comprise at least one dedicated subset of power control parameters for high priority PUSCH, at least one dedicated subset of power control parameters for low-priority PUSCH, and at least one dedicated subset of power control parameters for high-priority uplink control information (UCI) that is multiplexed on the low priority PUSCH;
   determine one subset from the at least one dedicated subset of power control parameters for the high-priority UCI that is multiplexed on the low priority PUSCH, or determine one subset from the at least one dedicated subset of power control parameters for the high-priority UCI that is multiplexed on the low priority PUSCH and determine at least one parameter from the determined subset; and
   apply the determined dedicated subset of power control parameters or the determined at least one parameter from the determined dedicated subset of power control parameters to determine the PUSCH transmission power when the high-priority UCI is multiplexed on the low-priority PUSCH.

13. The apparatus of claim 12, wherein the at least one memory and computer program code are further configured, with the at least one processor, to cause the apparatus at least to receive an indication via downlink control information (DCI) of (i) when a single dedicated subset of power control parameters for the high-priority UCI that is multiplexed on the low-priority PUSCH is configured, whether to apply the single dedicated subset of power control parameters and/or which of at least one parameter to apply from the single dedicated subset of power control parameters, and/or (ii) when at least two dedicated subsets of power control parameters for the high-priority UCI that is multiplexed on the low-priority PUSCH are configured, which subset from the at least two dedicated subsets of power control parameters to apply and/or which of at least one parameter to apply from the dedicated subset of power control parameters.

14. The apparatus of claim 13, wherein the at least one memory and computer program code are further configured, with the at least one processor, to cause the apparatus at least to transmit the low-priority PUSCH including the multiplexed high-priority UCI based on the applied one subset from the dedicated subset of power control parameters or the at least one power control parameter from the determined subset of power control parameters.

15. The apparatus of claim 13,
wherein the indication is received via downlink control information (DCI) corresponding to the low-priority PUSCH, or
wherein the indication is received via downlink control information (DCI) corresponding to physical uplink control channel (PUCCH) carrying high-priority UCI, or
wherein the indication is received via a group common downlink control information (DCI).

16. The apparatus of claim 12, wherein, when a single subset of power control parameters for the high-priority UCI that is multiplexed on the low-priority PUSCH is configured, the at least one memory and computer program code are further configured, with the at least one processor, to cause the apparatus at least to determine this single subset of power control parameters; or
wherein, when at least two subsets of power control parameters for the high-priority UCI that is multiplexed on the low-priority PUSCH are configured, the at least one memory and computer program code are configured, with the at least one processor, to cause the apparatus at least to determine a default subset of power control parameter from among the at least two subset of power control parameters.

17. The apparatus of claim 16, wherein the at least one memory and computer program code are further configured, with the at least one processor, to cause the apparatus at least to transmit the low-priority PUSCH including the multiplexed high-priority UCI based on the applied one subset from the dedicated subset of power control parameters or the at least one power control parameter from the determined subset of power control parameters.

18. The apparatus of claim 12, wherein the at least one dedicated subset of power control parameters for the high-priority UCI that is multiplexed on the low-priority PUSCH comprises at least one of:
one or more open loop power control parameters;
a closed-loop index;
a transmit power-control (TPC) command;
a scaling factor for at least one of the open loop power control parameters; and
an offset for at least one of the open loop power control parameters.

19. The apparatus of claim 12, wherein the at least one dedicated subset of power control parameters for the high-priority UCI that is multiplexed on the low-priority PUSCH comprises a power control parameter for which the value is determined based on a value of the corresponding power control parameter for a physical uplink control channel (PUCCH) that is initially scheduled or configured to carry the high-priority UCI.

20. The apparatus of claim 12, wherein:
when one or more open loop power control parameters are configured as part of the at least one dedicated subset of power control parameters for the high-priority UCI that is multiplexed on the low-priority PUSCH, the at least one memory and computer program code are further configured, with the at least one processor, to cause the apparatus at least to apply the one or more open loop power control parameters for a low-priority PUSCH open loop power control parameter value when the high-priority UCI is multiplexed on the low-priority PUSCH, or
when there is no high-priority UCI to multiplex on the low-priority PUSCH, the one or more open loop power control parameters are not applied.

* * * * *